(12) United States Patent
Asamura et al.

(10) Patent No.: US 7,717,466 B2
(45) Date of Patent: May 18, 2010

(54) MOUNTING STRUCTURE FOR FUEL PUMP OF VEHICLE ENGINE AND VEHICLE INSTALLING THE SAME

(75) Inventors: Kinji Asamura, Shizuoka (JP); Satoshi Suzuki, Shizuoka (JP); Fumito Hirano, Shizuoka (JP); Emiko Hirano, legal representative, Shizuoka (JP)

(73) Assignee: Yamaha Hatsudoki Kabushiki Kaisha, Shizoka (JP)

( * ) Notice: Subject to any disclaimer, the term of this patent is extended or adjusted under 35 U.S.C. 154(b) by 379 days.

(21) Appl. No.: 10/596,635

(22) PCT Filed: Jan. 11, 2005

(86) PCT No.: PCT/JP2005/000190

§ 371 (c)(1),
(2), (4) Date: Mar. 29, 2007

(87) PCT Pub. No.: WO2005/073063

PCT Pub. Date: Aug. 11, 2005

(65) Prior Publication Data

US 2007/0216151 A1    Sep. 20, 2007

(30) Foreign Application Priority Data

Jan. 30, 2004    (JP)    ............... 2004-022460

(51) Int. Cl.
B62J 35/00    (2006.01)
B62J 37/00    (2006.01)
(52) U.S. Cl. .................. 280/835; 123/509
(58) Field of Classification Search ........... 280/833, 280/835; 123/509; 210/416.4; 137/565.17, 137/565.34, 565.37
See application file for complete search history.

(56) References Cited

U.S. PATENT DOCUMENTS 6,182,640 B1    2/2001    Nakashima et al.

(Continued)

FOREIGN PATENT DOCUMENTS

EP    1043495 A2 *    10/2000

(Continued)

OTHER PUBLICATIONS

International Search Report issued in corresponding International Application No. PCT/JP2005/000190, mailed on Apr. 26, 2005.

*Primary Examiner*—Lesley Morris
*Assistant Examiner*—Wesley Potter
(74) *Attorney, Agent, or Firm*—Keating & Bennett, LLP

(57) ABSTRACT

A fuel pump mounting structure has an opening in a side surface or a bottom surface of a fuel tank. A fuel pump assembly including a cylindrical pump body and a filter connected to a suction side of the pump body is accommodated in a space located inside of the opening. A flange section of a housing that encloses the pump body engages an outside surrounding area of the opening. A mounting plate covers the outside of the flange section. The fuel pump assembly is fixed to the opening through the flange section and the mounting plate. The axis of the pump body extends generally parallel to a mounting surface of the mounting plate, and the pump body and the filter overlap each other relative to a position in a direction of the axis. The mounting structure reduces the moment against the mounting plate, reliably supports the fuel pump under a stable condition without requiring a large and rigid construction, and improves the seal with the fuel tank.

7 Claims, 4 Drawing Sheets

U.S. PATENT DOCUMENTS

| | | | |
|---|---|---|---|
| 6,283,731 B1 * | 9/2001 | Yoshioka | 417/423.3 |
| 6,655,363 B2 * | 12/2003 | Kobayashi et al. | 123/509 |
| 6,679,292 B2 * | 1/2004 | Ootaka et al. | 137/565.17 |
| 6,913,693 B2 * | 7/2005 | Unuki | 210/416.4 |
| 2002/0038653 A1 | 4/2002 | Kobayashi et al. | |
| 2008/0283321 A1 * | 11/2008 | Hirano et al. | 180/219 |

FOREIGN PATENT DOCUMENTS

| | | | |
|---|---|---|---|
| JP | 02028075 A * | 1/1990 | |
| JP | 11-093794 A | 4/1999 | |
| JP | 2001-082274 A | 3/2001 | |
| JP | 2002-106440 A | 4/2002 | |
| JP | 2003-049729 A | 2/2003 | |
| JP | 2003-074436 A | 3/2003 | |
| WO | WO 2004072469 A1 * | 8/2004 | |

* cited by examiner

MOUNTING STRUCTURE FOR FUEL PUMP OF VEHICLE ENGINE AND VEHICLE INSTALLING THE SAME

BACKGROUND OF THE INVENTION

1. Field of the Invention

The present invention relates to a mounting structure for a fuel pump accommodated in a fuel tank of a vehicle engine, and a vehicle including the fuel pump mounting structure.

2. Description of the Related Art

A fuel supply device disposed within a saddle type fuel tank that straddles a body frame is disclosed in Japanese Patent Application Publication No. 2002-106440. A fuel pump mounting structure described in Japanese Patent Application Publication No. 2002-106440 has an opening in a surface located inside of the saddle type fuel tank. A base plate closes the opening. The fuel pump is disposed in an inner space of the tank and mounted such that an axis of the fuel pump extends generally parallel to the base plate. That is, the fuel pump extends along the side surface where the base plate is attached. A filter is coupled with a suction side located at an end portion of the fuel pump, wherein the end portion extends along the axis of the fuel pump.

However, in the fuel pump mounting structure disclosed in Japanese Patent Application Publication No. 2002-106440, the fuel pump is cantilevered against the base plate. That is, the fuel pump is mounted such that an end of the fuel pump is affixed to the base plate, while the other end is not affixed to anything so as to be a free end. Further, the other end extends along the longitudinal axis and the filter is coupled with the other end. Because of this construction, a moment of the cantilever structure (external force pressing the fuel pump and the filter) against the base plate, which is a mounting plate for the fuel pump, can be large. Thus, a rigid mounting plate is necessary to support the fuel pump under a stable condition against the moment. Therefore, the mounting plate can be large, and the fixing structure, such as bolts, for fixing the mounting plate to a tank wall needs to be strengthened. The fixing structure causes an increase in the number of such bolts and increases the fixing time. In addition, the mounting plate needs to be tightly sealed to prevent fuel from leaking.

On the other hand, another fuel supply device for an internal combustion engine is disclosed in Japanese Patent Application Publication No. 2003-74436. A fuel pump mounting structure described in Japanese Patent Application Publication No. 2003-74436 has an opening provided at a top surface of a fuel tank. A fuel pump extends from a bottom surface of a lid that closes the opening and extends vertically therefrom. A suction side located at a distal end of the fuel pump has a filter.

However, the fuel pump mounting structure disclosed in Japanese Patent Application Publication No. 2003-74436 has a construction to support the fuel pump that projects a substantial distance downward from the lid, which is a mounting plate placed on an upper section of the fuel tank for the fuel pump, so as to suck the fuel in from a bottom of the fuel tank. Such a structure, in which the fuel pump extends substantially downward (i.e., in a vertical direction relative to a mounting surface) from the mounting plate of the fuel pump, creates a large moment against the mounting plate, if the mounting plate extends vertically from a side surface of the tank. This structure can cause problems regarding the strength and sealing functions of the mounting plate, similarly to the structure disclosed in Japanese Patent Application Publication No. 2002-106440. Also, the structure of the fuel pump that extends substantially in the vertical direction is not suitable for a bottom surface of the fuel tank.

SUMMARY OF THE INVENTION

The present invention is made in consideration of the above-mentioned related art. In order to overcome the problems described above, preferred embodiments of the present invention provide a fuel pump mounting structure for a vehicle engine, wherein the mounting structure is arranged to have a mounting plate for a fuel pump disposed at a side surface or a bottom surface of a fuel tank so as to decrease a moment against the mounting plate, to reliably support the fuel pump under a stable condition without requiring a large and rigid construction, and to improve a sealing function. Another preferred embodiment provides a vehicle including such a novel fuel pump mounting structure.

A preferred embodiment of the present invention provides a mounting structure for a fuel pump of a vehicle engine in which an opening is provided in a side surface or a bottom surface of a fuel tank, a fuel pump assembly including a cylindrical pump body and a filter coupled with a suction side of the pump body is accommodated in an inner space of the fuel tank relative to the opening, a flange section of a housing that encloses the cylindrical pump body abuts a surrounding area of the opening outside of the fuel pump, a mounting plate is covered from the outside of the flange section, and the fuel pump assembly is fixed to the opening through the mounting plate and the flange section. One of the unique characteristics of the mounting structure for the fuel pump of a vehicle engine is that an axis of the cylindrical pump body extends generally parallel to a mounting surface of the mounting plate, and the cylindrical pump body and the filter are arranged to overlap each other.

According to the present preferred embodiment, because the axial direction of the cylindrical pump body extends parallel or substantially parallel to the mounting plate of the fuel pump, the fuel pump does not extend from the mounting plate in a vertical direction. Thus, the moment against the mounting plate can be prevented from increasing and therefore minimized. Also, because the fuel pump is disposed such that the filter, which is coupled with a distal end side of the fuel pump, overlaps with the fuel pump, the moment against the mounting plate can be further reduced in comparison with a structure in which the filter extends outward from the distal end of the fuel pump along the axial direction. Thereby, the fuel pump can be reliably supported in a stable condition within the fuel tank using the simple and compact mounting plate, and the possibility of leaking fuel can be reduced.

Also, in another preferred embodiment of the present invention, the fuel tank is preferably a saddle type fuel tank that straddles a body frame, and the opening is provided in a side wall surface or a bottom surface located inside of the saddle type fuel tank.

According to this arrangement, in a saddle type fuel tank that can be used particularly for a motorcycle and has a configuration for straddling a body main frame, by positioning a mounting plate in a side wall surface or a bottom surface of either one of inside portions of a right and left side fuel reservoir section that interpose the main frame therebetween, the mounting plate and conduits, including a conduit toward the fuel pump, can be compactly placed without having to outwardly expand the external dimensions or periphery of the tank.

Also, in another preferred embodiment of the present invention, a fuel passage includes the filter, the cylindrical pump body, and a member through which fuel flows from the filter to the cylindrical pump body, wherein the fuel passage is folded back so as to overlap itself.

According to this arrangement, by making the configuration of the fuel passage that includes the filter, the conduit disposed on the suction side of the cylindrical pump body, and the cylindrical pump body to be an overlapping configuration, the filter and the cylindrical pump body overlap with each other in a view of a radial direction outward from the cylindrical pump body. Thus, the moment added to the mounting plate by the pump fixed to the mounting plate in a cantilevered state, i.e., the pump having an end that is affixed to the mounting plate and the other end that is not affixed to anything so as to be a free end, can be reduced. Thereby, the fuel pump can be reliably supported under a stable condition and a tight seal can be obtained.

Also, in a further preferred arrangement of the present invention, the opening is provided in the side wall surface located inside of the saddle type fuel tank, and the filter is disposed below the cylindrical pump body.

According to this preferred arrangement, by placing the mounting plate in the side wall surface located inside of the saddle type fuel tank, affixing the fuel pump to the side wall surface inside, and disposing the fuel pump below the fuel pump, a tight seal can be obtained and the fuel in the bottom of the tank can be efficiently sucked out with a compact construction and without making the moment against the mounting plate large.

Also, in a further preferred arrangement of the present invention, the opening preferably has an elliptical shape and a longitudinal axis of the opening extends generally horizontally (which includes both horizontally and substantially horizontally) and generally parallel (which includes both parallel and substantially parallel) to the axis of the cylindrical pump body.

According to this preferred arrangement, by putting the fuel pump assembly into the inner space of the tank through the opening that has an elliptical shape extending generally horizontally, and attaching the fuel pump to extend generally horizontally, a fuel tank that is compact in a vertical direction, i.e., a fuel tank which size is small in the vertical direction, can be obtained.

Also, in a further preferred arrangement of the present invention, the cylindrical pump body and the filter are spaced apart from each other in a direction normal to the axis of the cylindrical body.

According to this preferred arrangement, relative to the direction of the longitudinal axis of the pump, the pump and the filter disposed at the pump's end are connected with each other so as to overlap with one another, and relative to the direction normal to the axis of the pump, the pump and the filter are spaced apart from each other. Thus, when the fuel pump assembly is installed in the inner space of the tank through the opening, first of all, the filter can be inserted into the space, and then the cylindrical pump body can be inserted while its physical or angular positions are changed in sequence. Thereby, a fuel pump assembly having a larger size can be installed within the tank.

Also, in a further arrangement of the present invention, a mounting structure for a fuel pump of a vehicle engine is provided with a fuel pump assembly accommodated in an inner space of a fuel tank and mounted onto the fuel tank by a mounting plate, wherein the fuel pump assembly includes a cylindrical pump body and a filter attached to the cylindrical pump body, the cylindrical pump body is disposed such that an axis of the cylindrical pump body extends along a mounting surface of the fuel tank to which the mounting plate is affixed, and the filter is disposed such that at least a portion of the filter is located away from the cylindrical pump body in a radial direction of the pump body.

According to this preferred arrangement, because the axial direction of the cylindrical pump body extends along the mounting plate of the fuel pump, the cylindrical pump body does not extend from the mounting plate in a vertical direction. Thus, the moment against the mounting plate can be prevented from increasing. Further, the filter placed at its end of the fuel pump is disposed such that at least a portion of the filter is located spaced away from the cylindrical pump body in a radial direction of the pump body. The arrangement can further reduce the moment against the mounting plate in comparison with an arrangement in which the filter is not located in a position spaced in the radial direction of the pump body and the filter extends from the distal end of the fuel pump along the axial direction. Thereby, the fuel pump can be reliably supported under a stable condition within a fuel tank using the simple and compact mounting plate, and possibility of leaking can be reduced.

Also, in a further preferred arrangement of the present invention, an opening is provided in a side surface or a bottom surface of a fuel tank, the mounting structure for a fuel pump further includes a housing attached to the opening, the housing encloses the cylindrical pump body inside thereof, and has a flange section abutting an outside surrounding area of the opening, and the mounting plate extends over the flange section to fix the flange portion to the fuel pump body.

According to this preferred arrangement, because the housing encloses the cylindrical pump body inside thereof, and its flange section abuts the surrounding area of the opening, the cylindrical pump and the housing are firmly fixed to the fuel tank. Thus, the position of the cylindrical pump body does not change relative to the fuel tank even due to a traveling motion of the vehicle or to vibration. Accordingly, a fuel pump mounting structure that is superior in durability is achieved.

Also, in a further preferred arrangement of the present invention, the fuel pump mounting structure includes a fuel pipe having an end with which the cylindrical pump body is coupled, a trunk portion of the fuel pipe bends toward the filter, and another end to which the filter is coupled, and a fuel flow direction in the cylindrical pump body and a fuel flow direction in the filter are reversed from each other.

According to this preferred arrangement, the fuel pipe that connects the cylindrical pump body and the filter with each other is bent, and the filter is disposed such that the respective flow directions in the filter and the cylindrical pump body are reversed from each other. Thus, the filter is positioned in the proximity of the mounting plate of the cylindrical pump body. The moment against the mounting plate by the cylindrical pump body and the filter is thus minimized.

Also, a vehicle configured in accordance with another preferred embodiment of the present invention has the fuel pump mounting structure described above. According to this preferred embodiment, a vehicle that has a compact fuel tank can be achieved. Particularly, a vehicle such as a small size motorcycle can have a suitably sized fuel tank.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
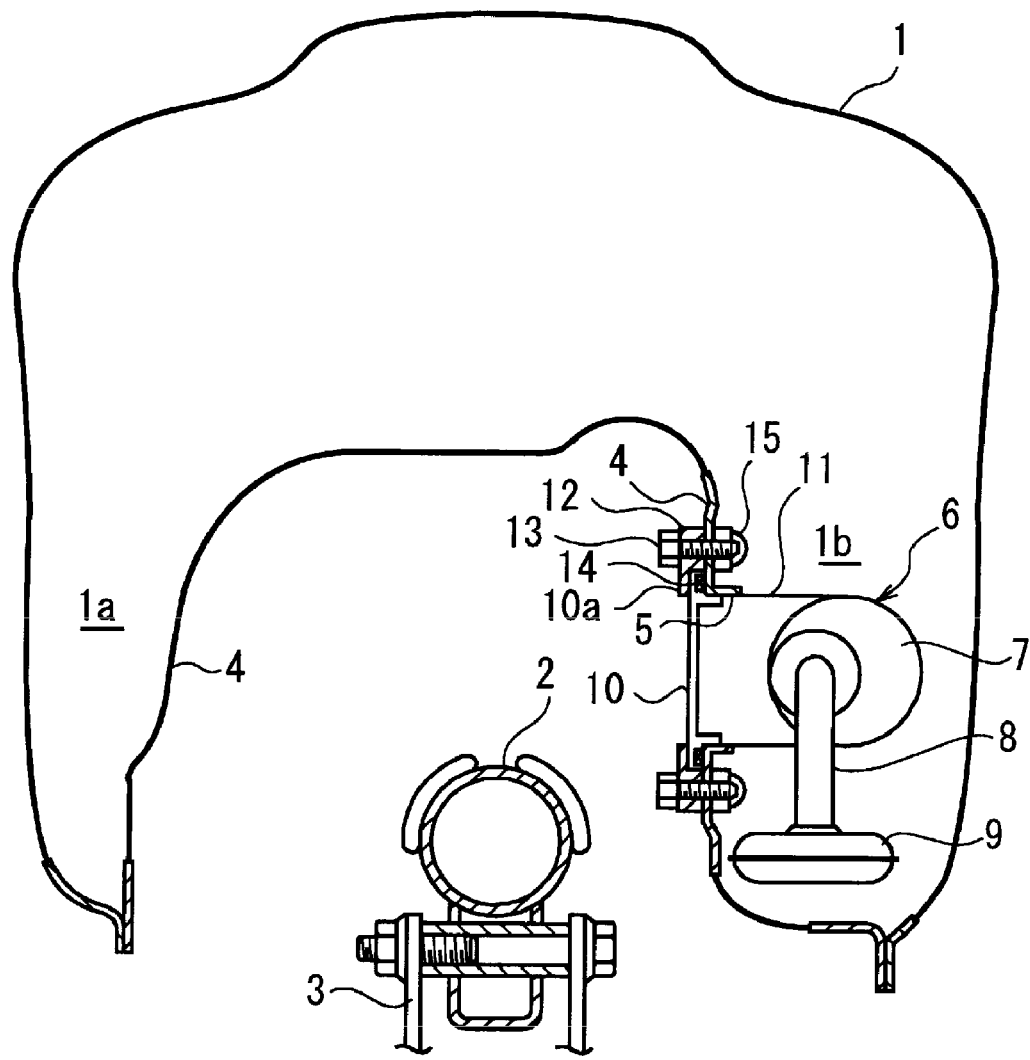
FIG. 1 is a vertical cross-sectional view of a preferred embodiment of the present invention.

FIG. 1 is a vertical cross-sectional elevation view of a preferred embodiment of the present invention. In this preferred embodiment, a fuel pump structure is shown as being accommodated within a saddle type fuel tank that straddles a body frame of a motorcycle. The saddle type fuel tank 1 has a configuration to straddle a main frame 2 extending fore to aft along a vehicle body (not shown). The main frame 2 is affixed to a head pipe through which a steering shaft coupled with a handle bar that is not shown extends. The main frame 2 is a pipe-shaped frame and is disposed to extend to a location below a seat. The main frame 2 supports an engine (not shown) via an engine bracket 3.

The fuel tank 1 has right and left fuel reservoir sections 1a, 1b on the sides of the main frame 2. The fuel tank 1 also has an opening 5 defined at a side wall 4 located inside of the fuel reservoir section 1b on the right side of the figure. An inside space next to the opening 5 accommodates a fuel pump assembly 6. The fuel pump assembly 6 includes a cylindrical pump body 7 and a filter 9 coupled to each other through a fuel pipe 8 which is connected to a suction side located at a distal end of the fuel pump body 7. A housing 11 is unitarily formed with the pump body 7. An end portion of the housing 11 has a flange cover 10 that closes the opening 5. A flange section 10a, which is a peripheral portion of the flange cover 10, abuts a surrounding area of the opening 5 outside of the fuel tank. A ring-shaped mounting plate 12 covers the flange section 10a outside of the fuel tank. The mounting plate fixes the flange cover 10 to a portion of the side wall 4 surrounding the opening 5 by bolts 13 and cap nuts 15 with a seal member 14 interposed therebetween.

Figure 2:
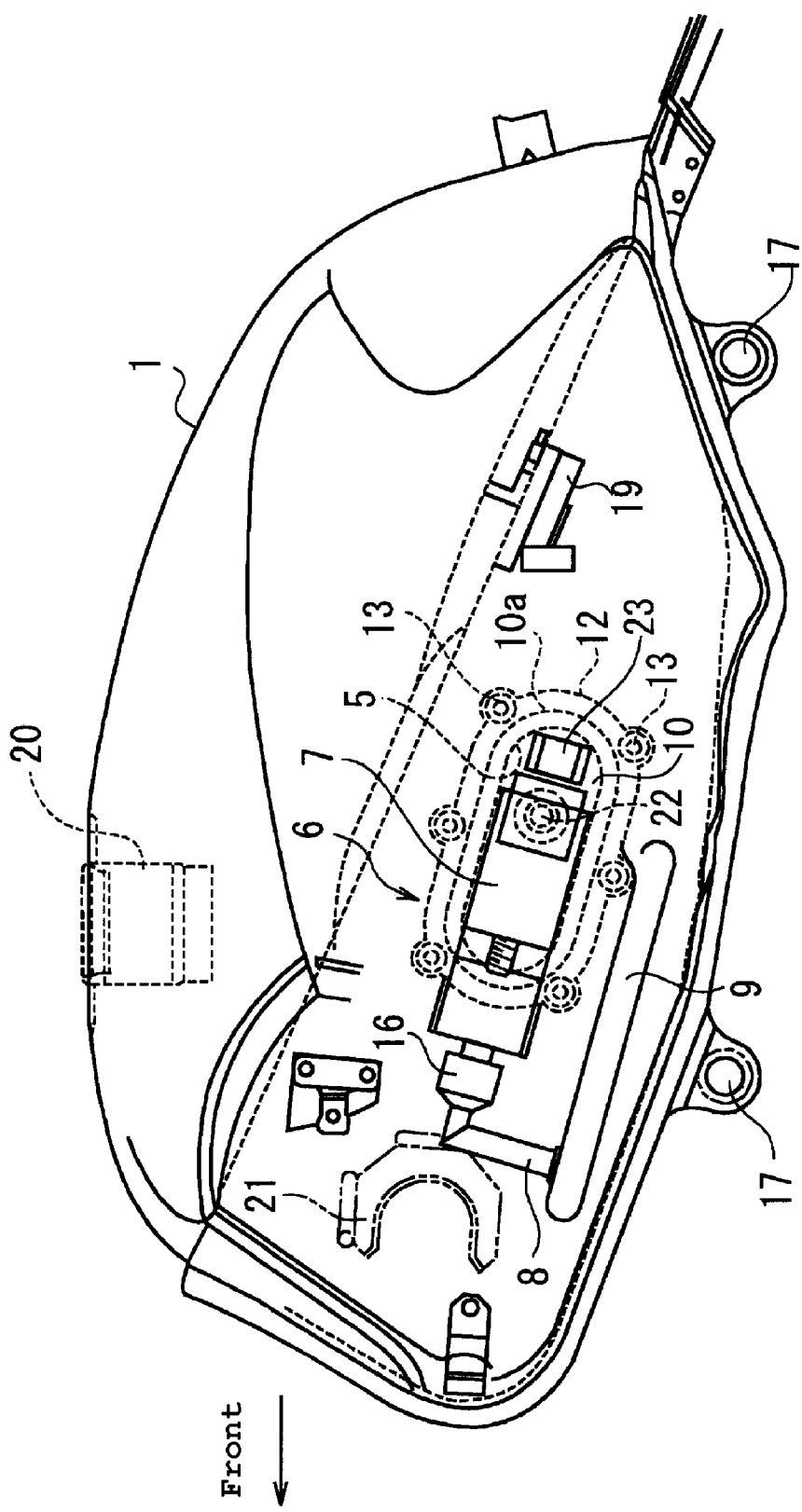
FIG. 2 is a side view illustrating a fuel tank of FIG. 1.
Figure 3:
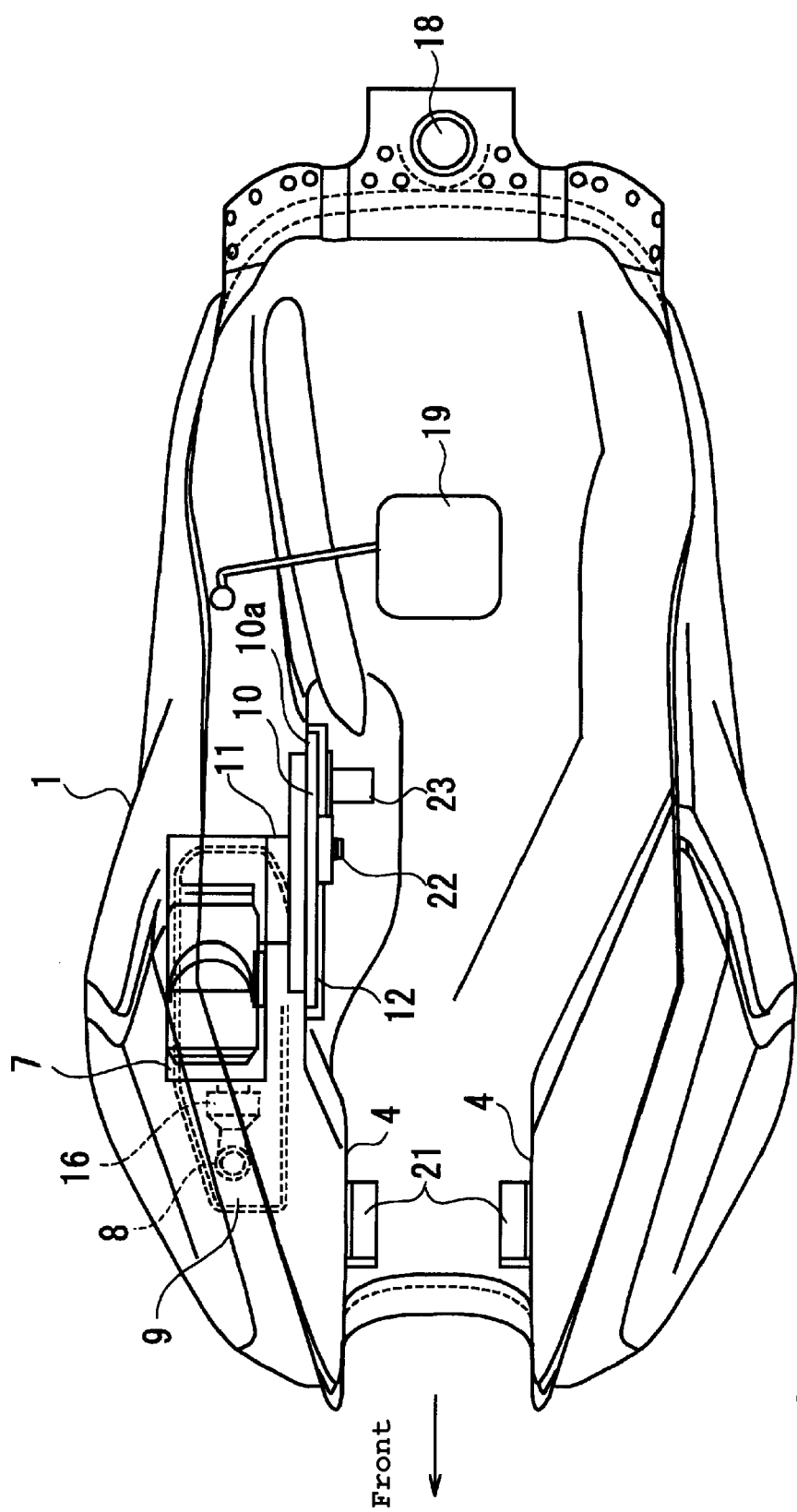
FIG. 3 is a bottom plan view illustrating the fuel tank of FIG. 1.

FIGS. 2 and 3 are side and bottom plan views illustrating the fuel tank of FIG. 1, respectively. The mounting plate 12 covers the flange section 10a that is the peripheral portion of the flange cover 10 of the fuel pump assembly 6. A plurality (e.g., six) of bolts 13 (see FIG. 2) fix the flange section 10a to the surrounding area of the opening 5 of the fuel tank 1. The opening 5 preferably has an elliptical shape. Preferably, a longitudinal axis of the opening 5 extends generally horizontally. The direction of the axis coincides with an axial direction (longitudinal direction) of the pump body 7. The fuel pipe 8 is connected to a front end of the pump body 7 that is the suction side thereof through a joint 16. The fuel pipe 8 bends downward at its trunk portion 8a. The filter 9 is coupled with a bottom end of the fuel pipe 8 to extend along the pump body 7. The filter 9 is positioned below the pump body 7. Because the fuel pipe 8 extending from the front end of the pump body 7 along the axial direction of the pump body (i.e., forwardly) bends downward, a fuel passage of the suction side, which is defined by the fuel pipe 8 and the filter 9, has an overlapping configuration. Also, the pump body 7 and the filter 9 are vertically spaced apart from each other so as to overlap one another in a top or bottom plan view. The fuel suctioned from the filter 9 flows toward a portion where the fuel pipe 8 is coupled with the filter 9 and further flows through the fuel pipe 8. Afterwards, the fuel turns 90 degrees in the trunk portion 8a of the fuel pipe 8 and flows into the pump body 7. Thus, a fuel flow direction F1 in the filter 9 and a fuel flow direction F2 in the pump body 7 are reversed from each other. Because of the arrangement, the center of gravity of the filter 9 approaches the center of gravity of the pump body 7. The external force pressing the mounting plate 12 thus can be reduced by the moment of the fuel pump assembly 6 that is mounted onto the mounting plate 12 in a cantilevered state. In other words, the external force can be reduced by the fuel pump assembly 6 in which the pump body 7 is fixed to the mounting plate 12 while the side of the filter 9 extends freely.

Each right or left bottom end of the fuel tank 1 has a hole 17 through which a grommet for mounting a body cover (not shown) can extend. Also, a rear end of the fuel tank 1 has a hole 18 (FIG. 3) through which a grommet for mounting a body frame (not shown) can extend. Reference numeral 19 denotes a liquid level detecting device and reference numeral 20 (FIG. 2) denotes a fuel inlet. The fuel tank 1 has support members 21 with which the fuel tank 1 is mounted onto the body frame. Each support member 21 is placed at a location in a front area of the side wall 4 (FIGS. 1 and 3) that extends on the right or left inside of the fuel tank 1. The support members 21 hold a bracket that is affixed to the main frame 2 (FIG. 1) to sustain the fuel tank 1 on the main frame 2. Reference numeral 22 denotes a fuel outlet with which a fuel hose (not shown) is coupled. Reference numeral 23 denotes an electric power source connector.

Figure 4:
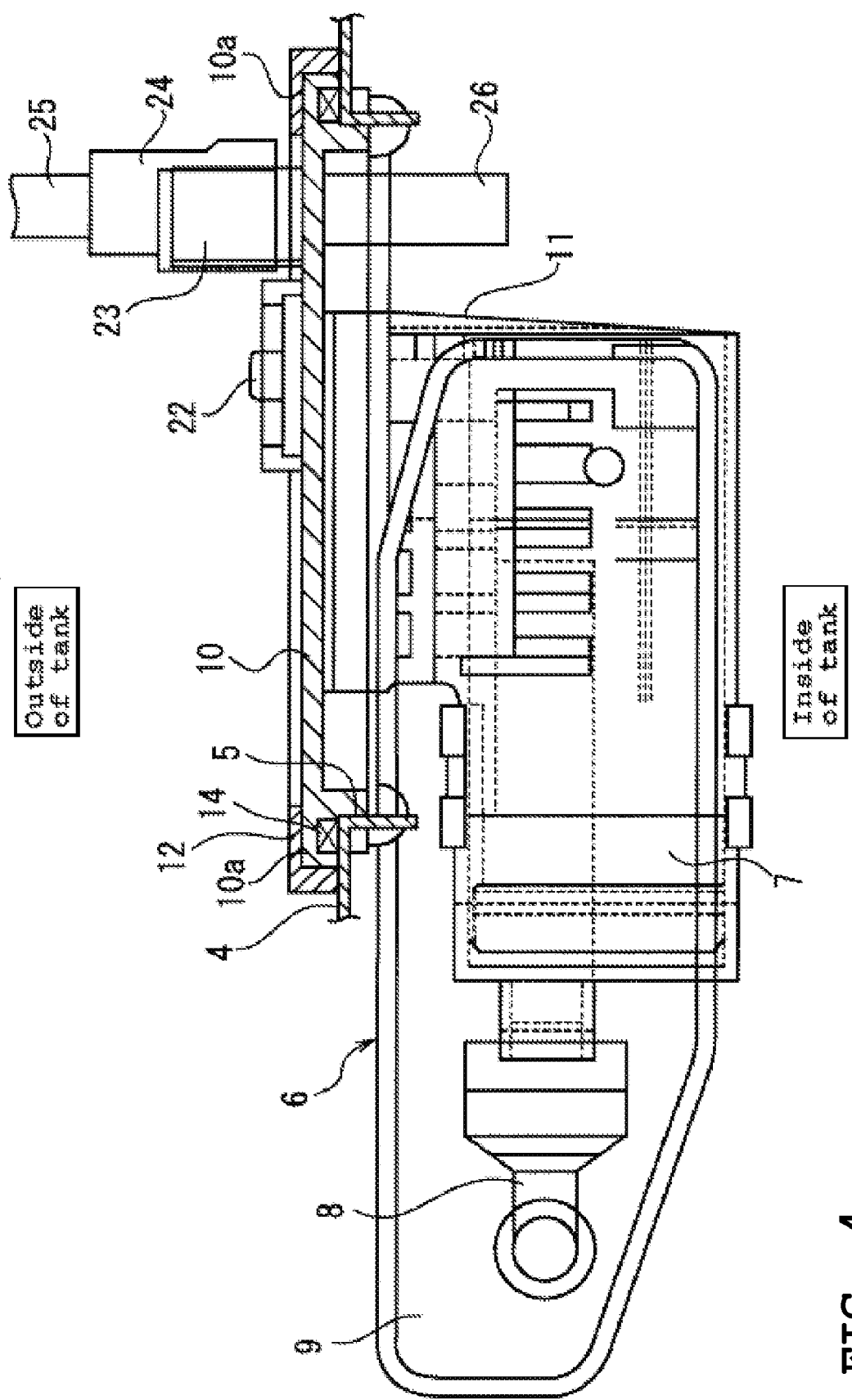
FIG. 4 is a detailed view illustrating a mounting portion of a fuel pump assembly of FIG. 1.

FIG. 4 is a detailed view illustrating a mounting portion of the fuel pump assembly of FIG. 1. The opening 5 is provided in the side wall 4 of the fuel tank with the opening 5 extending back into the internal space of the tank. The flange cover 10 of the fuel pump assembly 6 is affixed to the side wall 4 of the fuel tank via the seal member 14 to close the opening 5. The ring-shaped mounting plate 12 extends over the peripheral flange section 10a of the flange cover 10 and is affixed by the bolts 13 (see FIG. 2) as described above. The fuel outlet 22 protrudes beyond the flange cover 10. The fuel hose is coupled through a coupler that is not shown.

The flange cover 10 further has the power source connector 23 which is connected to a battery (not shown) mounted on the motorcycle through a harness coupler 24 and a harness 25. The power source connector 23 is also connected to a power source terminal 26 that is disposed on an inside surface of the flange cover 10 to supply electric power to the fuel pump through a cable that is not shown.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A mounting structure for a fuel pump of a vehicle engine, the mounting structure comprising:
    a fuel pump assembly including a cylindrical pump body and a filter coupled with a suction end of the pump body;
    a fuel tank arranged to straddle a body frame of a vehicle;
    a housing enclosing the cylindrical pump body, a flange section of the housing arranged to abut an outside area surrounding an opening in the fuel tank; and
    a mounting plate arranged to cover the flange section on an outside of the fuel tank, the fuel pump assembly arranged to be fixed to the opening through the mounting plate and the flange section; and
    a fuel pipe including a first end with which the cylindrical pump body is coupled, a trunk portion of the fuel pipe bending toward the filter, and a second end with which the filter is coupled, wherein a fuel flow direction in the cylindrical pump body and a fuel flow direction in the filter are opposite to each other; wherein an axis of the cylindrical pump body extends generally parallel to a mounting surface of the mounting plate;

the cylindrical pump body and the filter are arranged to overlap each other;

the opening is arranged in a side wall surface of the fuel tank, the mounting plate is attached to the opening of the side wall surface of the fuel tank, wherein the opening has an elliptical shape, and a longitudinal axis of the opening extends generally horizontally and generally parallel to the axis of the cylindrical pump body.

2. The mounting structure for a fuel pump of a vehicle engine according to claim 1, wherein the filter is disposed below the cylindrical pump body.

3. The mounting structure for a fuel pump of a vehicle engine according to claim 1, further comprising a fuel passage, wherein the fuel passage includes the filter, the cylindrical pump body, and the fuel pipe through which fuel flows from the filter to the cylindrical pump body, wherein a portion of the fuel passage is arranged so as to overlap another portion of the fuel passage.

4. The mounting structure for a fuel pump of a vehicle engine according to claim 1, wherein the cylindrical pump body and the filter are spaced apart from each other in a direction normal to the axis of the cylindrical pump body.

5. A vehicle comprising the mounting structure for a fuel pump according to claim 1.

6. A mounting structure for a fuel pump of a vehicle engine, the mounting structure comprising:

a fuel tank arranged to straddle a body frame of a vehicle;

a fuel pump assembly to be arranged within an inner space of the fuel tank, the fuel pump assembly including a mounting plate arranged to mount the fuel pump assembly onto the fuel tank, the fuel pump assembly further including:

a cylindrical pump body;

a filter attached to the cylindrical pump body;

an opening arranged in a side surface of the fuel tank, wherein the opening has an elliptical shape, and a longitudinal axis of the opening extends generally horizontally and generally parallel to the axis of the cylindrical pump body;

a housing enclosing the cylindrical pump body, a flange section of the housing arranged to abut an outside area surrounding the opening in the fuel tank, and the mounting plate extending over the flange section to fix the flange section to the fuel tank; and a fuel pipe including a first end with which the cylindrical pump body is coupled, a trunk portion of the fuel pipe bending toward the filter, and a second end with which the filter is coupled, wherein a fuel flow direction in the cylindrical pump body and a fuel flow direction in the filter are opposite to each other; wherein the cylindrical pump body is arranged such that an axis of the cylindrical pump body extends along a mounting surface of the mounting plate;

the filter is arranged such that at least a portion of the filter is spaced away from the cylindrical pump body in a radial direction of the cylindrical pump body;

the mounting plate is attached to the opening of the side surface of the fuel tank;

and the cylindrical pump body and the filter are arranged to overlap each other.

7. A vehicle comprising the mounting structure for a fuel pump according to claim 6.

* * * * *